UNITED STATES PATENT OFFICE.

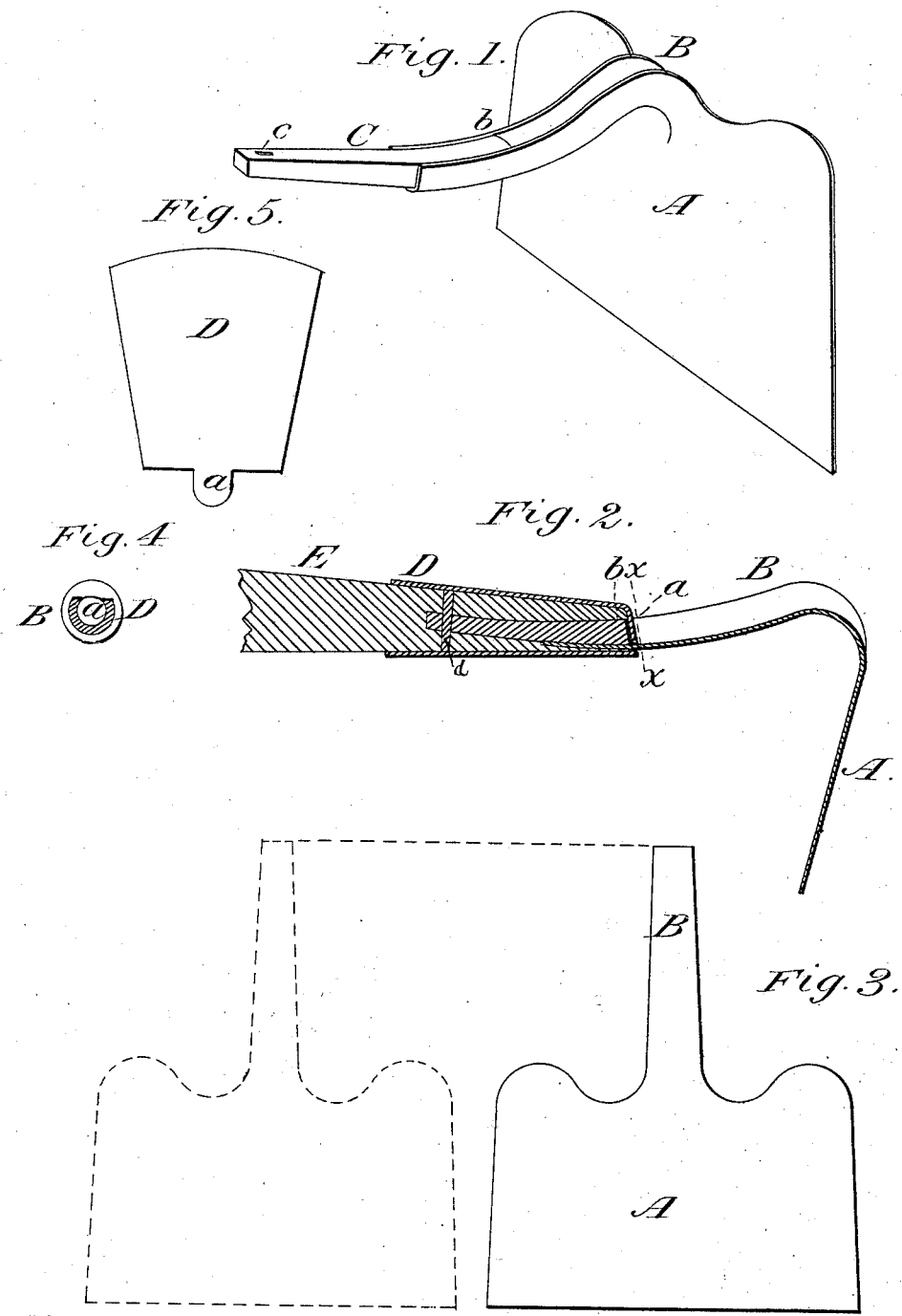

NELSON W. MILLS, OF OTSEGO, MICHIGAN.

IMPROVEMENT IN HOES.

Specification forming part of Letters Patent No. 216,210, dated June 3, 1879; application filed November 23, 1878.

*To all whom it may concern:*

Be it known that I, NELSON W. MILLS, of Otsego, in the county of Allegan, State of Michigan, have invented a new and useful Improvement in Hoes, of which the following is such a full and exact description as will enable others to make the same, reference being had to the accompanying drawings, and to the letters of reference marked thereon, similar letters indicating like parts in the different figures.

This invention relates to an improvement in hoes used for agricultural purposes, the object of the improvement being to reduce the cost of manufacture and improve the finished article by adding to the stiffness of the shank without any increase of its weight, thus making the implement more durable, as greater strength is given to the hoe for a certain weight of metal.

In the drawings, Figure 1 shows the hoe and shank with the ferrule and handle removed. Fig. 2 is a section through the handle, ferrule, and shank, showing the construction and arrangement of the parts in the implement when complete. Fig. 3 shows one of the steel blanks from which the hoe is made, the dotted lines showing the manner of cutting them from the blanks. Fig. 4 is a section of the shank on the line $x\,x$ of Fig. 2. Fig. 5 shows one of the blanks from which the ferrules are made.

The blades A of these hoes are formed of steel, commonly rolled sheets of suitable thickness, from which they are cut preferably by means of punches and dies having the same form as the blank shown in Fig. 3. The part or extension B of the plate is then bent by suitably-shaped dies or other means, so as to have a semicircular or grooved cross-section, as shown in Fig. 4 of the drawings, thus forming, after being bent into a proper curve, the shank or neck of the hoe. Before bending, however, the spud or tang C is welded into the end of the shank, after which the proper bend or curve is given to cause the hoe, when attached to the handle, to have the desired relative position thereto.

The hoe is now ready for grinding and polishing, which operations are performed by applying it to rapidly-rotating grindstones and emery-wheels in the ordinary manner of finishing such implements.

The ferrule D is formed from a piece of sheet-metal cut as shown in Fig. 5, with a projecting lip, $a$. After the ferrule has been bent to shape, and the two adjoining edges united by brazing, welding, or other means, it is placed upon the end of the handle E, and the tang C driven into a previously-prepared hole bored in the end of the handle for its reception until the large end, $b$, of the tang is even with the end of the ferrule. The lip $a$ is then turned down over the end $b$ of the tang into the groove formed by the curvature of the shank B, thus causing the tang to be securely held in place, and stiffening the connection between the shank and handle.

A hole, $c$, may be made in the tang, and a rivet, $d$, inserted through it and the handle as an additional fastening, if desired.

The whole will be found to form an implement simple in form, easily constructed, combining the greatest possible strength with little weight, and enabling the manufacturer to work his metal without waste, as is clearly shown by Fig. 3 of the drawings, in which the lines of cut are indicated by the dotted lines.

Having thus described my invention, I claim as new, and desire to secure by Letters Patent, the following:

1. The hoe-blade provided with the curved hollow shank or extension B, in combination with the tang C, welded thereto, substantially as and for the purpose set forth.

2. The handle E and curved shank B, in combination with the ferrule D, provided with lip $a$, turned down into the groove of the shank, substantially as specified.

3. A hoe consisting of a blade having a curved hollow or grooved shank formed from the same piece of metal as the blade and with a tang welded thereto, in combination with a suitable handle and lipped ferrule, applied in the manner and for the purpose set forth.

Signed at Otsego November 16, 1878.

NELSON W. MILLS.

Witnesses:
SIDNEY ROUSE,
H. D. MILLS.